United States Patent [19]

Faulhaber

[11] 4,361,789

[45] Nov. 30, 1982

[54] SMALL D.C. MOTOR

[76] Inventor: Fritz Faulhaber, 6981 Vernate, Tessen, Switzerland

[21] Appl. No.: 90,482

[22] Filed: Nov. 1, 1979

[30] Foreign Application Priority Data

Nov. 8, 1978 [AT] Austria .................................. 8002/78
Feb. 8, 1979 [AT] Austria ................................... 932/79

[51] Int. Cl.³ ........................................... H02K 29/02
[52] U.S. Cl. .................................... 318/254; 318/138;
318/439
[58] Field of Search ................................ 318/138, 254

[56] References Cited

U.S. PATENT DOCUMENTS 3,495,148  2/1970  Marchal et al. ...................... 318/254
4,004,202  1/1977  Davis .................................... 318/138
4,107,595  8/1978  Campe .................................. 318/138

Primary Examiner—J. V. Truhe
Assistant Examiner—S. M. Bergmann
Attorney, Agent, or Firm—Michael J. Striker

[57] ABSTRACT

A small D.C. motor has an ironless armature comprised of a winding carrier disk secured to the motor output shaft for rotation therewith and carrying an armature winding comprised of a plurality of component coils connected together in star configuration. The common or center terminal of the star-configuration interconnection of component coils is connected to one slip ring. A plurality of control circuits are provided, one for each component coil. Each control circuit connects the other terminal of the respective component coil to a further slip ring. The control circuits control the flow of current through the component coils, are light-activated and exposed to light from a lamp through the intermediary of a circle-segment aperture in a rotating light-blocking structure.

3 Claims, 4 Drawing Figures

SMALL D.C. MOTOR

BACKGROUND OF THE INVENTION

The present invention generally concerns small D.C. motors, of the type whose armature winding is not provided with a cooperating armature iron structure. Instead, the armature winding is mounted on a winding carrier plate, and the latter is secured to the motor output shaft for rotation therewith. The armature winding is typically subdivided into a plurality of component coils. The plural component coils of the armature winding each have end terminals conductively connected to respective slip rings, one end terminal of each component coil being connected in common to a shared slip ring so that the plural component coils are effectively connected together in star configuration.

SUMMARY OF THE INVENTION

It is a general object of the invention to provide a small D.C. motor, preferably one not having any substantial armature iron structure, of the general type set forth above or similar thereto, but capable of quick start-up, exhibiting a long service life and little susceptibility to malfunction. The efficiency and service life of the motor should be at least comparable to those of more conventional small D.C. motors of the types in question.

In accordance with the present invention, this is accomplished by providing a plurality of control circuits, one for each component coil of the armature winding, each control circuit being connected to the respective component coil for controlling the flow of current through the component coil.

Preferably, the first end terminals of the plural component coils are electrically connected in common, and their common terminal is connected to a first slip ring, with the second end terminals of the component coils being all connected to a second slip ring but through the intermediary of their respective control circuits.

Preferably each control circuit comprises a control transistor and a switching transistor, for example interconnected in Darlington configuration, with the base of each such control transistor being at times exposed to light emitted from, e.g., a glow lamp, so as to render the control transistor conductive and in turn render conductive the associated switching transistor.

The plural electronic control circuits are advantageously mounted on a collector plate which is mounted to rotate along with the aforementioned winding carrier plate.

By means of the glow lamp, it becomes possible, for example, to expose to light the control transistors of the control circuits of successive adjoining pairs of component coils of the armature winding, i.e., such that of the star-connected component coils current flows through the first and second coils, then the second and third coils, and so forth.

According to a further concept of the invention, there is provided a regulator disk which rotates along with the motor rotor, the regulator disk comprising a circumferential sequence of alternately light transmissive and nontransmissive sectors which successively move through the light of the aforementioned glow lamp. Light transmitted through the transmissive sectors of the regulator disk is incident upon an electronic regulator circuit, e.g., an IC module, provided with a suitable phototransistor and operative for producing an output signal serving as an actual-rpm signal which can be compared against a desired-rpm command signal, to produce an error signal for negative-feedback regulation of motor rpm.

Preferably, the collector plate with the electronic control circuits for the plural component coils mounted thereon, the slip rings, and the regulator disk are provided as a single structural element removable as a whole from the remainder of the structure of the motor.

The control transistors of the plural control circuits, each associated with a respective component coil of the armature winding, are exposed to light emitted from the aforementioned lamp through the intermediary of a light-blocking member having a light-transmitting aperture which is in the form of a segment of a circle, with the angular span of the light-transmitting aperture being such that, for example, successive neighboring pairs of five star-connected component coils of the armature winding are made to conduct current, i.e., assuming that the armature winding consists of five component coils connected together in star configuration.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
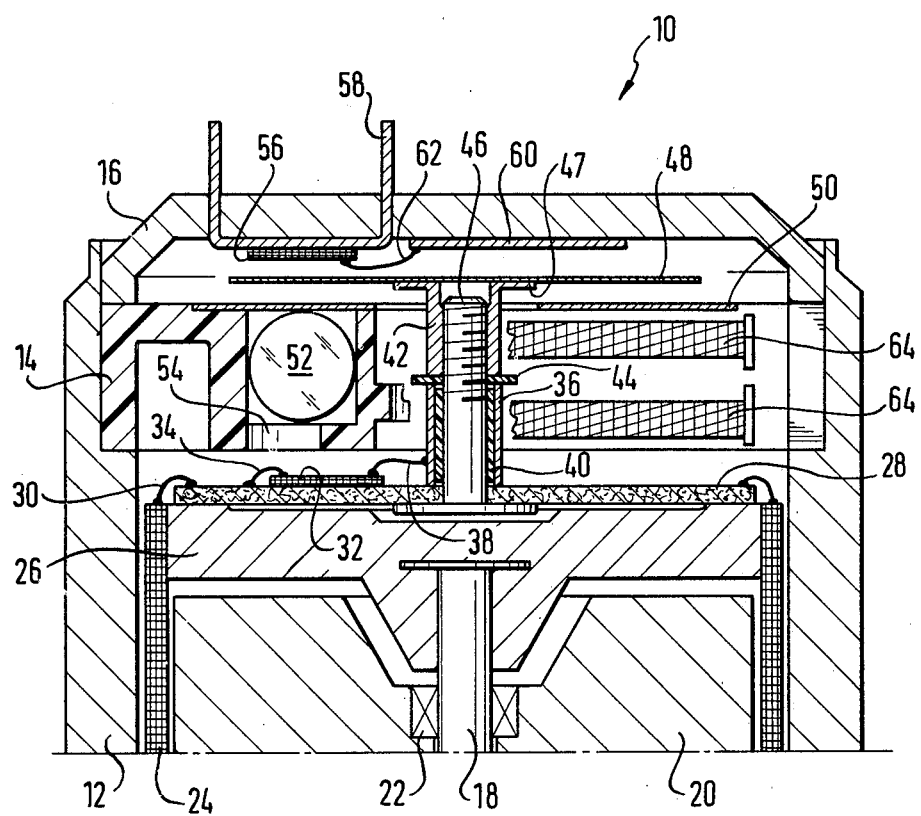
FIG. 1 schematically depicts, in section, part of a D.C. motor exhibiting features of the present invention.

The motor 10 partly depicted in FIG. 1 comprises a housing which includes an iron flux-return structure 12, an inner lid 14 made of electrically insulating plastic and an outer lid 16. (The other or lower end of such motor, not depicted in the drawing, may of course likewise be provided with an end cover or end lid.)

The motor output shaft 18 is rotatably mounted in stationary bearings, of which one bearing 22 is shown between the motor shaft 18 and a stator magnet 20. The end of the motor shaft depicted in FIG. 1 carries an armature winding carrier plate 26 to which the armature winding 24 is secured for rotation along with the motor shaft 18.

The side of the armature winding carrier plate 26 which faces away from motor shaft 18 carries a supporting plate 28, which latter rotates synchronously with the armature and the motor shaft 18. The plate 28, which may for example be a structure composed of glass fiber suitably coated with copper on one or both of its end faces, forms the substrate for a plurality of control circuits 32 which are secured to plate 28 and thus rotate along with the motor rotor; the control circuits preferably have the form of IC chips.

Fixedly secured to the supporting plate 28, i.e., for rotation therewith, is a threaded pin 46 coaxial with the motor shaft 18. Pin 46 mounts a slip ring 36 which is electrically insulated from threaded pin 46 by an intervening sleeve 40 of electrically insulating material. Pin 46 also mounts a further slip ring 42 which is electrically insulated from slip ring 36 by an intermediate disk 44 of electrically insulating material. However, slip ring 42 is in conductive connection with pin 46, and may for example be a threaded element threaded onto pin 46. Electrical energy is fed to the two slip rings 36 and 42 by brushes 64, mounted by conventional means in the motor housing, e.g., in the interior of the inner lid 14. The brushes 64 are connected to a (non-illustrated) energy source by means of (non-illustrated) electrical leads.

Each of the control circuits 32 (IC chips) is connected via, e.g., a line 38 to slip ring 36, and furthermore via a line 34 to a suitable location on the copper coating on the collector plate 28, and by a line 30 to a respective one of the component coils which make up the armature winding 24. (In FIG. 1, the armature winding 24 is shown, but not its component coils.)

A lamp 52, e.g., a glow lamp, is accommodated in an opening in the inner lid 14 and casts light onto successive ones of the IC chips 32 through a slot 54 in lid 14, in a manner described below. The slot 54 in lid 14 has the form of a segment of a circle and has an angular span such as to be able to cast light onto a predetermined number of IC chips 32 at any given time, the center of the circle-segment slot 54 coinciding with the axis of motor shaft 18 and pin 46. If the armature winding 24 is made up of five star-connected component coils and accordingly five IC chips 32 are used angularly spaced on supporting plate 28 at intervals of 72° one from the next, then the angular span of the slot 54 is at least about 144°. (In FIG. 1 the electrical connecting lines for the glow lamp 52 are omitted, to avoid overcrowding.)

Mounted on slip ring 42 is a regulator disk 48 fixedly secured to the enlarged flange-like end portion 47 of the slip ring 42, so as to rotate at the rpm of motor shaft 18. Regulator disk 48 comprises a circumferential succession of light-transmissive and non-transmissive portions, for example in the form of narrow angular sectors which extend radially outward from the center of regulator disk 48 to its peripheral edge. The disk 48 can, for example, comprise about one hundred of such sectors, alternate ones of which are light-transmissive and non-transmissive.

Mounted on the inner lid 14, between the rotating regular disk 48 and the lamp 52, is a further regulator disk 50 which is fixedly connected to the lid 42 and accordingly stationary during motor operation. Its construction is the same as that of rotating regulator disk 48, although only the part of stationary regulator disk 50 which is permanently located above the lamp 52 is actually operative for anything, the remainder of the angular span of the disk 50 not being called on actually to perform any light-modulating function. However, for reasons of simplicity, the rotating regulator disk 48 and also the stationary regulator disk 50 are of the same design, i.e., comprised of a complete circumferential succession of alternately light-transmissive and non-transmissive sectors.

A regulating circuit 56 is located at the side of the rotating regulator disk 48 facing away from the lamp 52, regulating circuit 56 having for example the form of an IC-chip circuit module which may, for example, be secured to the inner wall of the outer housing lid 16 and be provided with outwardly extending cooling ribs 58, all as shown. Regulating circuit 56 is connected via a line 62 to a conductive strip or terminal 60 which, in turn, is connected to (non-illustrated) leads which lead out of the motor for connection to an energy source and to, e.g., a comparator circuit used for negative-feedback rpm control.

Figure 2:
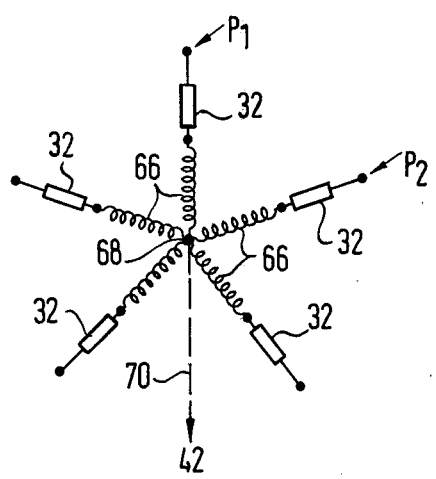
FIG. 2 depicts the interconnections among the component coils of the armature winding and the plural control circuits associated with the respective component coils.

FIG. 2 schematically depicts the star-configuration connection of the component coils 66 of the armature winding 24. As illustrated, each component coil 66 has associated with it a respective control circuit 32, e.g., in the form of an IC chip, which is connected between the free end terminal of the respective coil 66 and the slip ring 36. The center point 68 of the star-configuration winding is connected, via a conductor 70 indicated by the broken line, to the slip ring 42.

Figure 3:
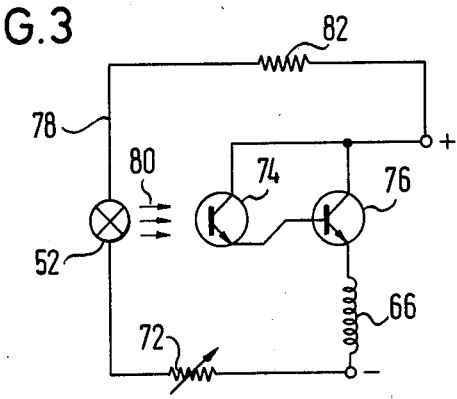
FIG. 3 depicts in greater detail one component coil and the configuration of its associated control circuit.

FIG. 3 depicts in detail the configuration of one component winding 66 and its associated control circuit chip 32. Each control circuit 32 comprises two transistors, i.e., a control transistor 74 and a switching transistor 76, connected together, as shown, in Darlington configuration. The collectors of the two transistors 74, 76 are connected in common to the positive terminal of a source of electrical energy, the emitter of the control transistor 74 being connected with the base of switching transistor 76, and the emitter of the latter being connected to one end terminal of the associated component coil 66, the other end terminal of which is connected to the negative terminal of the energy source. A line 78 parallel to the transistors and the component winding 66 includes the glow lamp 52, which latter illuminates the base of control transistor 74, transistor 74 being here a phototransistor, as indicated by the arrows at 80. Connected in series with lamp 52 are a potentiometer 72 and a current-limiting resistor 82.

Figure 4:
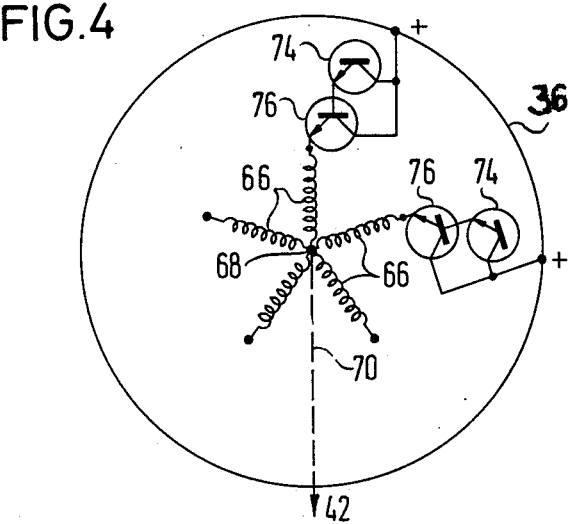
FIG. 4 depicts the configuration of five star-connected component coils of an armature winding, with the associated control circuit chips therefor, and the connections of the first and second end terminals of the component coils to the slip rings employed.

FIG. 4 schematically depicts the arrangement of the five component coils 66, the associated transistors 74, 76 as well as their connections to the slip rings employed.

As shown, there is associated with each component coil 66 a transistor 74 and a transistor 76 interconnected in the manner already described with respect to FIG. 3. The positive terminal of the source, to which the collectors of the two transistors 74, 76 are connected, is connected to the slip ring 36. The center point of the star-connected component coils 66 is connected via a line 70 to the slip ring 42, which latter is in turn connected to the negative terminal of the source.

The inventive motor operates as follows:

The five component coils 66 are each connected at their respective free end terminals, and via their respective control circuits 32, to the slip ring 36, whereas the common or center terminal 68 of the coils 66 is connected to the slip ring 42.

The respective control circuits 74, 76 normally block the flow of current from the slip ring 36 to their respective component coils 66, i.e., the current path between the two slip rings 36 and 42 is normally interrupted. However, if now, as shown in FIG. 3, the base of a control transistor 74 is exposed to light from glow lamp 52, that transistor 74 becomes conductive and supplies current from its emitter to the base of the associated switching transistor 76, as a result of which the latter becomes conductive, thereby closing the electrical connection shown in FIG. 3 extending between the positive and negative source terminals, i.e., such that the current path from the slip ring 36 to the slip ring 46 and through the respective component coil 66 is closed.

It is assumed that the motor is so designed that successive pairs of adjoining control chips 32 are exposed to light from lamp 52 at a time, so that two neighboring component coils 66 are supplied with current at a time as indicated by the two arrows P1, P2 in FIG. 2. Due to the parallel flow of current throught the two component coils 66 affected, the impedance of the armature winding is considerably reduced. In order to be able to illuminate two successive control chips 32 at a time, the slot 54 in lid 14, which is of the form of a circle segment, has an angular span of at least about 144°, assuming a five-coil star-configuration winding whose component coils are equally spaced one from the next by 72°. Accordingly, during motor operation, the phototransistors of the first and second chips 32 will be illuminated and their associated windings energized, then the phototransistors of the second and third chips 32, then of the third and fourth chips 32, and so forth, so that at any given time the phototransistors of two neighboring ones of the chips 32 will be exposed to light from glow lamp 52, as the sucession of five chips 32 orbit about the motor axis. Accordingly, the energy supplied to the motor is always being fed to two component coils 66, although which two component coils these are changes or advances in sucession during motor operation.

A motor of this design has a very long service life and very little susceptibility to malfunction, because the possibility of spark development is eliminated. Furthermore, it is capable of fast start-up.

As shown in FIG. 1, the light emitted from the glow lamp 52 is cast not only upon the control chips 32 but also, through the intermediary of the stationary regulator disk 50 and the rotating regulator disk 48, upon the regulating chip 56, which latter will likewise include an appropiate control transistor, here a phototransistor in the case of use of a lamp. As already stated, the two regulator disks are comprised of alternately light-transmissive and non-transmissive sectors, so that due to the rotation of regulator disk 48 (which rotates at the rpm of motor shaft 18) the light emitted from lamp 52 towards regulating chip 56 will alternately be maximally incident upon chip 56 (i.e., when the light-transmissive portions of the two disks 50, 48 are in register) and minimally incident (i.e., when it is the light-transmissive and non-transmissive sectors of the two disks 59, 48 which are in register with each other).

Accordingly, regulating chip 56 produces an output signal whose value varies in dependence upon motor rpm. This output signal, which is applied via line 62 to connecting terminal or strip 60, can in turn be applied as the feedback signal to a comparator, for negative-feedback control of motor rpm, e.g., by control of the intensity of the light from lamp 52.

Additionally, the potentiometer 72 in the current path of lamp 52 can be adjusted or regulated to vary the amount of light emitted from the lamp, in such a manner as to vary the extent to which the switching transistors 76 are conductive when rendered conductive, to thereby increase or decrease the electrical energy fed to the component coils 66. In this way, it also becomes possible to adjust or regulate the motor's torque.

As shown, the collector plate 28 with its electronics, i.e., its chips 32, the slip rings 36 and 42, the rotating regulator disk 48 and the pin 46 form a single structural unit which can be removed as a whole, i.e., as a single element, from the motor, after the collector plate 28 has been disconnected from the winding carrier plate 26. This structural unit can also find utility in motors of the type whose armature is provided with an iron armature structure. The collector plate with its electronics and, furthermore, be replaced by a mechanical collector. In such event, the rotating regulator disk can be secured to the collector.

It will be understood that, instead of activating the control circuits 32 by the light emitted from a lamp 52, use could be made of suitable magnetic means, for example, in which case the phototransistors might be replaced by Hall elements; and so forth.

It will likewise be understood that the illustrated five-coil star-configuration armature winding is merely exemplary, and that for example, a three-coil Y-connected armature winding might instead be involved.

As shown in FIG. 1, there are arranged in the inner lid 14 the lamp 52, the stationary regulator disk 50, possibly a (non-illustrated) series resistor for the lamp 52, the two brushes 64 and also the two (non-illustrated) holders for the brushes. At the side of the lid at which the brushes are arranged, the lid 14 is advantageously provided with a slot which extends out somewhat past the center of the structure, so that the lid can be easily assembled in place, e.g., be pushed into place from the side. The regulating circuit 56 and the terminal or contact strip 60 connected thereto via line 62, in contrast, are mounted on the inner face of the external lid 16, so as to assume correct positions when lid 16 is laid into place.

It will be understood that each of the elements described above, or two or more together, may also find a useful application in other types of circuit configurations and constructions, differing from the types described above.

While the invention has been illustrated and described as embodied in a two-slip-ring D.C. motor whose armature winding is made up of component coils interconnected in star configuration, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a D.C. motor, in combination, a rotor including an armature winding comprising a plurality of component coils connected together in star configuration, slip rings connected to the component coils and to the center of the star-configuration coils, and plural electronic control circuits, one for each component coil, each electronic control circuit being connected between one terminal of the respective component coil and an assigned slip ring for controlling the flow of current through the respective component coil, the electronic control circuits and the slip rings being mounted on a supporting plate mounted on the rotor of the motor for rotation with the rotor of the motor.

2. In a D.C. motor as defined in claim 1, the control circuits being light-activated, furthermore including means directing light onto successive control circuits, and furthermore including a rotating regulator disk connected to the slip rings and exposed to the light from the light directing means.

3. In a D.C. motor as defined in claim 2, the regulator disk having a plurality of circumferentially successive alternately light-transmissive and non-transmissive angular sectors, furthermore including a light-responsive circuit positioned to receive light transmitted through the regulator disk and generate electrical signals proportional to the received light.

* * * * *